United States Patent
Pech

(10) Patent No.: US 10,053,628 B2
(45) Date of Patent: Aug. 21, 2018

(54) METHOD FOR TREATING CARBONACEOUS MATERIALS BY VAPOR THERMOLYSIS

(71) Applicant: Alpha Recyclage Franche Comte, Brevans (FR)

(72) Inventor: Jean-Louis Pech, Toulouse (FR)

(73) Assignee: ALPHA RECYCLAGE FRANCHE COMTE, Brevans (FR)

( * ) Notice: Subject to any disclaimer, the term of this patent is extended or adjusted under 35 U.S.C. 154(b) by 107 days.

(21) Appl. No.: 14/773,681

(22) PCT Filed: Mar. 8, 2013

(86) PCT No.: PCT/FR2013/050497
§ 371 (c)(1),
(2) Date: Dec. 9, 2015

(87) PCT Pub. No.: WO2014/135754
PCT Pub. Date: Sep. 12, 2014

(65) Prior Publication Data
US 2016/0083657 A1 Mar. 24, 2016

(51) Int. Cl.
*C07C 1/00* (2006.01)
*C10B 53/07* (2006.01)
(Continued)

(52) U.S. Cl.
CPC ............. *C10B 53/07* (2013.01); *C08J 11/12* (2013.01); *C09C 1/482* (2013.01); *C10B 21/08* (2013.01);
(Continued)

(58) Field of Classification Search
CPC ....................................................... C07C 1/00
(Continued)

(56) References Cited

U.S. PATENT DOCUMENTS

2009/0250332 A1* 10/2009 Wu .................. C10B 47/44
202/94

FOREIGN PATENT DOCUMENTS

EP 0 693 539 A2 1/1996
EP 2 236 588 A1 10/2010
(Continued)

*Primary Examiner* — Thuan D Dang
(74) *Attorney, Agent, or Firm* — Seed Intellectual Property Law Group PLLC; Hai Han

(57) ABSTRACT

The present invention relates to a method for treating carbonaceous materials by steam thermolysis, comprising: shredding carbonaceous waste materials; introducing the shredded carbonaceous waste materials into a reactor heated by combustion gases, gases laden with steam being introduced into the reactor so as to heat said shredded carbonaceous waste materials to a temperature between 200 and 700° C. during a steam thermolysis reaction; cooling the combustion gases to a temperature between 200 and 450° C. and discharging said gases; discharging from the reactor the vapor/gas products formed in the reactor by steam thermolysis, followed by condensation of said products; separating the condensate obtained from said condensation into water containing residual hydrocarbons and into oil, and the water from the condensate being used as a source of heat energy for the reactor. The present invention also relates to a device for implementing the invention.

6 Claims, 2 Drawing Sheets

(51) Int. Cl.
    *C08J 11/12*     (2006.01)
    *C10B 47/44*     (2006.01)
    *C10B 51/00*     (2006.01)
    *C10G 1/00*     (2006.01)
    *C10G 1/02*     (2006.01)
    *C10G 1/04*     (2006.01)
    *C10G 1/06*     (2006.01)
    *C09C 1/48*     (2006.01)
    *C10B 21/08*     (2006.01)
    *C10B 23/00*     (2006.01)
    *C10B 27/06*     (2006.01)

(52) U.S. Cl.
    CPC .............. *C10B 23/00* (2013.01); *C10B 27/06* (2013.01); *C10B 47/44* (2013.01); *C10B 51/00* (2013.01); *C10G 1/00* (2013.01); *C10G 1/02* (2013.01); *C10G 1/047* (2013.01); *C10G 1/06* (2013.01); *Y02P 20/143* (2015.11); *Y02W 30/703* (2015.05)

(58) Field of Classification Search
    USPC ........................................ 585/240, 241, 242
    See application file for complete search history.

(56) References Cited

FOREIGN PATENT DOCUMENTS

| | | |
|---|---|---|
| FR | 2 877 427 A1 | 5/2006 |
| FR | 2 929 526 A1 | 10/2009 |
| RU | 2276170 C2 | 5/2006 |
| WO | 02/38350 A1 | 5/2002 |
| WO | 2008/030137 A1 | 3/2008 |
| WO | 2008/075105 A1 | 6/2008 |
| WO | 2012/140375 A1 | 10/2012 |

\* cited by examiner

METHOD FOR TREATING CARBONACEOUS MATERIALS BY VAPOR THERMOLYSIS

TECHNICAL FIELD

The present invention relates to the treatment of carbonaceous waste and can be used, for example, in the chemical industry for the production of carbon black or in the rubber industry for obtaining components based on rubber mixtures.

TECHNOLOGICAL BACKGROUND

One problem which arises in this type of industry is related to the recycling of wastewater, also called condensate, resulting from the condensation of vapors emitted during carbonaceous waste treatment processes, particularly those using steam thermolysis.

PRIOR ART

Methods are described in the prior art for treating carbonaceous materials by steam thermolysis.

Patent application WO 2008030137 describes a method for processing used tires comprising their pyrolysis in a reactor, separation and then grinding of the solid phase, separation of the liquid and gaseous phases by condensation followed by combustion of the gaseous phase used as a source of heat, mixture of the solid and liquid phases, with the gaseous products resulting from pyrolysis of the tires being used in a mixture with steam in the mass ratio (1.0-5.0):1. The method described in that patent application does not consider treating the toxic byproducts generated during the processing of used tires.

Patent RU 2276170 describes another method, comprising thermal decomposition of carbonaceous waste in a reactor in a vapor-gas medium, separation of the decomposition products into vapor-gas products and into solid carbon residue, and grinding of the carbon residue. Prior to grinding the carbon residue, the metal is removed by magnetic separation.

The oil extracted from the vapor-gas products by condensation undergoes thermal decomposition into soot and gas at a temperature between 900 and 2000° C. (degrees Celsius). After the oil extraction, the vapor-gas products are burned together with the carbon residue and the soot is obtained by filtering the combustion products. The gases from thermal decomposition of the oil are burnt and the products of this combustion are used as a heating medium to heat the reactor externally.

Drawbacks associated with this method arise from the high amount of energy consumed to produce 1 kg of soot and from the significant amount of carbon residue burned without soot formation during combustion together with the vapor-gas products, and finally from the complex introduction of waste into the reactor because of the need to extract the oil from the vapor-gas products using special equipment.

Furthermore, significant releases into the environment of harmful combustion products result from a large amount of burned materials: the gases from the thermal decomposition of the oil, the vapor-gas products, and a portion of the ground carbon residue. The quality of carbon black obtained by this method is also relatively low after combustion of a portion of the ground carbon residue, with a reduced proportion of carbon in the soot that is formed and an increased ash content.

Patent EP 2236588 describes a method for using pyrolysis water, but this method essentially aims to provide a solution to the problem of using biomass as an energy source, in particular as an alternative to fossil energy sources such as oil, coal, and natural gas. The method described in this patent consists of a method for treating wastewater containing organic matter, resulting from pyrolysis of biomass and not from treatment of carbonaceous materials.

Treatment of wastewater produced by methods for steam thermolysis of carbonaceous materials is a problem that has not yet been seriously addressed. The treatment of carbonaceous materials, particularly rubber waste, and the recycling of this energy source, is a relatively new technology. Aspects concerning the quality of the resulting carbon black and the productivity of such treatment facilities were given first priority, to the detriment of other aspects related to the energy efficiency of these facilities and to compliance with certain health, ecological, and general environmental criteria.

SUMMARY OF THE INVENTION

The present invention aims to overcome the disadvantages of the prior art, by reducing the energy consumed when producing carbon black and by decreasing the amount of harmful emissions released into the environment. It aims to provide treatment of the wastewater produced during steam thermolysis of carbonaceous materials and to reduce the pollution harmful to the health and environment related to the appearance and concentration of these industrial by-products.

A first aspect of the invention relates to a method for treating carbonaceous materials by steam thermolysis which comprises:
  shredding carbonaceous waste materials,
  introducing the shredded carbonaceous waste materials into a reactor heated by combustion gases, gases laden with steam being introduced into the reactor, so as to bring said shredded carbonaceous waste materials to a temperature between 200 and 700° C., preferably between 400 and 600° C., during a steam thermolysis reaction,
  cooling the combustion gases to a temperature between 200 and 450° C. and discharging said gases,
  discharging from the reactor the vapor-gas products formed in the reactor by steam thermolysis, followed by condensation of said products,
  separating the condensate obtained by said condensation into water containing residual hydrocarbons and into oil;
  the water from the condensate being used as a source of heat energy for the reactor.

In contrast to known methods that conventionally provide for rerouting the wastewater, after condensation and separation of the combustion products, toward a steam generator, the wastewater from the condensate is thus recovered for reuse within the carbonaceous waste treatment plant. Heat treatment of this wastewater also avoids the release of the toxic products present in this water into the environment, which represents an ecological benefit and also solves the problem of odors related to this wastewater.

In one particular embodiment, the combustion gases used to heat the reactor come from combustion of a fuel and/or combustion of the uncondensed gases obtained after condensation of the vapor-gas products formed in the reactor by steam thermolysis. Thus, the source of heat energy for heating the reactor according to the invention may come from combustion of water from the condensate, combined with combustion of a fuel possibly associated with or replaced by combustion of the uncondensed gases obtained after condensation of the vapor-gas products formed in the reactor by steam thermolysis. This improves the energy efficiency of the method by reducing the externally supplied fuel, one of the objectives of the method being to approach energy independence and a more complete use of all the resources provided by the treated carbonaceous materials.

In one particular embodiment, the uncondensed gases obtained after condensation of the vapor-gas products formed in the reactor by steam thermolysis are heat-treated, or in other words burned, to heat the reactor independently of the combustion of water coming from the condensate. In this manner, there is no interference between combustion of water from the condensate and combustion of uncondensed gases from steam thermolysis of the carbonaceous waste materials. This provides better control of these combustions and facilitates regulation of the heat energy supplied to the reactor.

In one particular embodiment, the oil from the condensate is evaporated in a first fraction with a boiling point less than or equal to 200° C., called the light fraction, and a second fraction with a boiling point greater than 200° C., called the heavy fraction.

Preferably, the boiling point of the light fraction is between 60° C. and 200° C., and the boiling point of the heavy fraction is between 201° C. and 600° C., which optimizes the quality of the light and heavy fractions obtained.

Separating oil in a first fraction with a boiling point less than or equal to 200° C. allows obtaining a liquid of low viscosity, ensuring that this liquid impregnates the particles of the ground carbon fraction by filling the pores of said particles. Impregnation of the carbon residue particles by oil directly separated from the vapor-gas product is not possible, as this oil has a high viscosity and is effectively unable to enter the pores of the particles.

Separating oil in a second fraction with a boiling point greater than 200° C. allows obtaining higher quality raw materials for the production of carbon black, as this fraction has an optimal ratio of hydrogen to carbon for ensuring a quality yield of carbon black during thermal decomposition of this fraction.

In one embodiment of the invention, a portion of the discharged combustion gases are condensed into water which is used to generate the steam used to heat the shredded carbonaceous waste materials inside the reactor. Here again, this maximizes the utilization of by-products generated by the treatment of carbonaceous materials. This allows a facility implementing the method according to the invention to operate while minimizing the need for externally provided resources.

Another aspect of the invention relates to a device for implementing the method for treating carbonaceous materials according to the first aspect of the invention described above. The device of the invention is particularly suited for the production of quality carbon black while reducing toxic emissions into the environment, by reusing the wastewater in the plant's production cycle.

More specifically, a device is proposed for treating carbonaceous materials by steam thermolysis, comprising means, such as a hopper, for introducing shredded carbonaceous waste materials into a reactor supplied with fuel from a tank, equipped with a burner and a casing receiving the combustion products suctioned off by a fume extractor to a scrubber, a steam generator supplying steam to a steam superheater in order to bring the steam inside the reactor to a temperature between 200 and 700° C., a reactor outlet for discharging the vapor-gas products formed in the reactor into a condenser connected to a separator, a storage tank receiving the wastewater from the condensate, and means for bringing said wastewater from said storage tank to the burner.

Advantageously, the device may further comprise an evaporator receiving oil from the separator and adapted to allow evaporation of the oil into a first fraction with a boiling point less than or equal to 200° C., called the light fraction, and a second fraction with a boiling point greater than 200° C., called the heavy fraction. Preferably, this evaporator allows evaporation of the light fraction with a boiling point between 60° C. and 200° C., and of the heavy fraction with a boiling point between 201° C. and 600° C.

In one particular embodiment, the condenser may be provided with means for bringing the uncondensed gases obtained from condensation of the vapor-gas products formed in the reactor by steam thermolysis, to the burner.

Alternatively, the condenser may be provided with means for bringing the uncondensed gases obtained from condensation of the vapor-gas products formed in the reactor by steam thermolysis to a burner that is independent of the burner for the wastewater heat treatment, which provides better control and regulation of the combustion of water from the condensate and of the uncondensed gases from the steam thermolysis of carbonaceous waste materials, used to heat the reactor.

Advantageously, the independent burner which allows heat treating the vapor-gas products formed in the reactor by steam thermolysis in order to heat the reactor, is supplied fuel from the tank.

In one embodiment, the scrubber may be connected to condensing means adapted to recover water from the combustion products, the device being further adapted to reuse the water recovered by said condensing means to generate steam at the reactor.

BRIEF DESCRIPTION OF DRAWINGS

Other features and advantages of the invention will become apparent upon reading the following description. This description is purely illustrative and should be read with reference to FIGS. 1 and 2 which show the layout of the facility for implementing the method for treating carbonaceous materials by steam thermolysis according to embodiments of the invention.

DETAILED DESCRIPTION OF EMBODIMENTS

Figure 1:
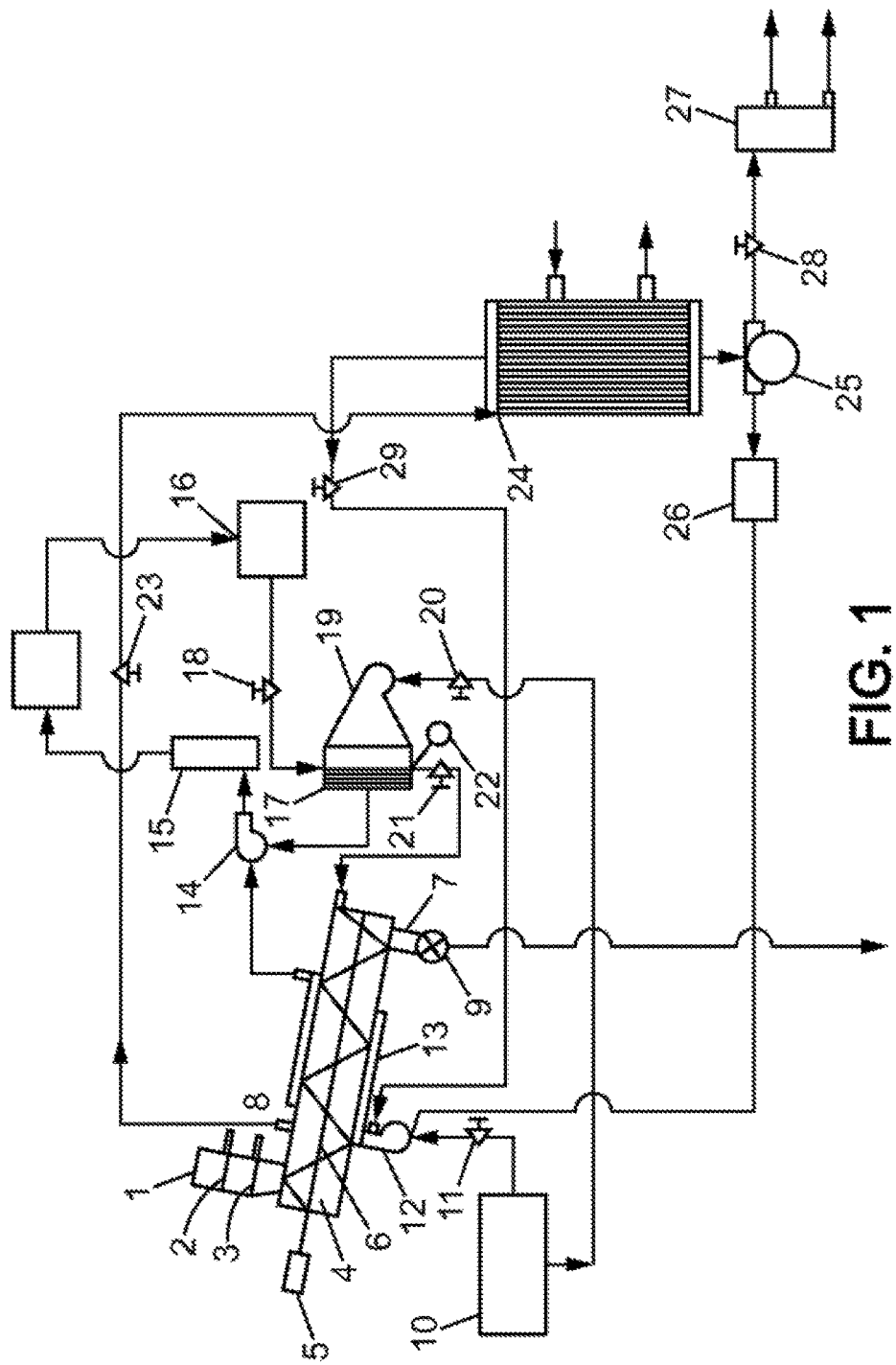

In a conventional method for steam thermolysis of carbonaceous materials such as waste rubber, wastewater is formed, also called condensate, essentially corresponding to the condensed steam and separated from the liquid hydrocarbon fraction which contains the hydrocarbon mixture. Analysis of this condensate shows that it contains, among other things:

caprolactam (concentration: 1.16 g/l), $C_6H_{11}NO$: main substance from the thermal decomposition, lactam from e-epsilon aminocaproic acid or cyclic amide from e-epsilon aminocaproic acid, in the form of white crystals. This compound has high polymerization capacity when heated (250-260° C.) in the presence of a small amount of water, alcohol, amines, organic acids, and other combinations to form a useful polymer, poly-e-caproamide (polyamide resin) and raw materials for the formation of capron.

benzoic acid (concentration: 0.21 g/l), $C_6H_5COOH$: elementary aromatic acid in the form of colorless bright crystals.

cyclopentanone (adipic ketone, ketopentamethylene) (concentration: 0.13 g/l), $C_5H_8O$: colorless liquid with a pungent odor. Form of ketone derivatives.

furfuryl alcohol (2-furancarbinol) (concentration: 0.11 g/l) $C_5H_6O_2$: liquid soluble in water.

catechol (1,2-dihydroxybenzene) (concentration: 0.09 g/l) $C_6H_4(OH)_2$: easily oxidized to o-benzoquinone.

phenols (oxybenzol, carbolic acid) (concentration: 0.08 g/l) $C_6H_5OH$: colorless crystals which become pink under light. Obtained by separation of coal tar, by hydrolysis of chlorobenzene from steam in the presence of a catalyst, etc.

o-dimethoxybenzene (resorcinol dimethyl ether) (concentration: 0.07 g/l) $C_6H_4(OCH_3)_2$.

p-methoxyphenol (concentration: 0.05 g/l) $CH_3OC_6H_4OH$.

benzothiazole (concentration: 0.03 g/l) $C_7H_5NS$: yellow liquid having an unpleasant odor. Compound distilled in steam.

All of these compounds present in the wastewater from steam thermolysis of carbonaceous materials is of significant toxicity not only to the environment but also to humans. Release of this wastewater into the environment leads to significant pollution of the air, soil, and groundwater. It is also accompanied by a strong and objectionable smell that is unpleasant for personnel and for those living near plants that process carbonaceous materials. The proliferation in recent years of industrial projects aiming to solve the problem of recycling waste rubber has resulted in the appearance and concentration of these harmful side products for which no ecological treatment has yet been considered.

In addition, the formation and accumulation of this condensate during treatment of carbonaceous material is accompanied by problems within the steam thermolysis facility. Most existing plants for treating carbonaceous material eliminate such wastewater by evaporation. However, because of the physico-chemical properties of some compounds present in the wastewater, a foam forms that greatly reduces the effectiveness of evaporation and thus the elimination of wastewater. It is also possible for the evaporation of wastewater to produce sludge that can foul pipes and clog the drainage within and near the plant.

The operation of the screw reactors used in this type of plant inevitably results in further grinding of the carbon black as the screw rotates, carrying the dust into the condensing system. Some of this dust is therefore found in the wastewater. During evaporation, the dust (some of it small carbon particles) remains in the residue, resulting in the formation of sludge which fouls the evaporator.

The present invention solves these problems by a method for treating carbonaceous materials by steam thermolysis which yields a good quality of carbon black and provides an environmentally friendly solution to the wastewater problem.

Referring to the diagram of the embodiment of the device shown in FIG. 1, shredded carbonaceous waste materials, in the form of shredded rubber in this example, is fed into a hopper 1 equipped with closed closures 2 and 3. After this, closure 2 is opened so that the waste in the hopper 1 falls downward and rests on closure 3. Next, closure 3 is opened and the waste portion falls into the cylindrical reactor 4. Closure 3 is then closed. Simultaneously, the screw 6 installed in the cylindrical reactor 4 is rotated by the motor 5. The shredded solid waste is caught by the screw and carried along the cylindrical reactor 4 toward the outlet 7 which is fitted with a rotating closure 9, then is subjected to the subsequent processing steps to obtain carbon black (such as the steps described in international patent application WO 2012/140375). The time the waste spends traveling in the cylindrical reactor is controlled by the rotational speed of the screw 6. Simultaneously with the initiation of the method and the movement of the waste, fuel is introduced from the tank 10 by the control valve 11 into the burner 12 where it is burned. The products of this combustion, which are in the form of combustion gases, are directed towards the casing 13 of the reactor 4. As they pass into the casing 13, the fuel combustion gases heat the reactor, then cool in turn and are sent to the scrubber 15 by means of the fume extractor 14.

The steam generator 16 supplies steam through valve 18 to the steam superheater 17, to bring the steam to a temperature between 200 and 700° C., preferably between 400 and 600° C. To achieve this, the fuel from the tank 10 is supplied to the burner 19 via valve 20. The carbonaceous waste material is heated inside the reactor 4 by contact with the steam raised to the temperature of 200-700° C. The combustion gases from the casing 13 are cooled to a temperature between 200 and 450° C. before being sent by the fume extractor 14 to the scrubber 15.

The superheated steam from the superheater 17 is fed through valve 21 into the cylindrical reactor 4. The temperature of the steam is controlled based on indications from the temperature sensor 22 so that the superheat temperature is not exceeded. Rubber waste moves through the reactor 4 and is heated by contact with the hot walls of the reactor and by convective heat exchange with the steam supplied in the reactor. This results in steam thermolysis of the waste, with release of gaseous products and solid carbon residues.

The vapor-gas products formed from steam thermolysis of the shredded carbonaceous waste materials are discharged from the reactor 4 into the condenser 24 through outlet 8 via valve 23. In the condenser 24, they are condensed by heat exchange with the cooling water to form a condensate comprising water and oil. The condensate is then sent to the separator 25 where the water is separated from the oil. The water obtained after such separation is yellow in color and has a strong unpleasant odor. It contains, in addition to residual hydrocarbons, toxic compounds that can include, among others, caprolactam, benzoic acid, cyclopentanone, furfuryl alcohol, catechol, phenol, o-dimethoxybenzene, p-methoxyphenol, and benzothiazole, as has been described above. This yellow water is sent to the storage tank 26 for subsequent heat treatment in the burner 12.

The oil from the separator 25 is transferred to the evaporator 27 via valve 28. In the evaporator, it is separated into a first fraction with a boiling point less than or equal to 200° C. (light fraction) and a second fraction with a boiling point greater than 200° C. (heavy fraction).

The uncondensed gas fraction coming from the condenser 24 via valve 29 can be burned in the burner 12.

Figure 2:
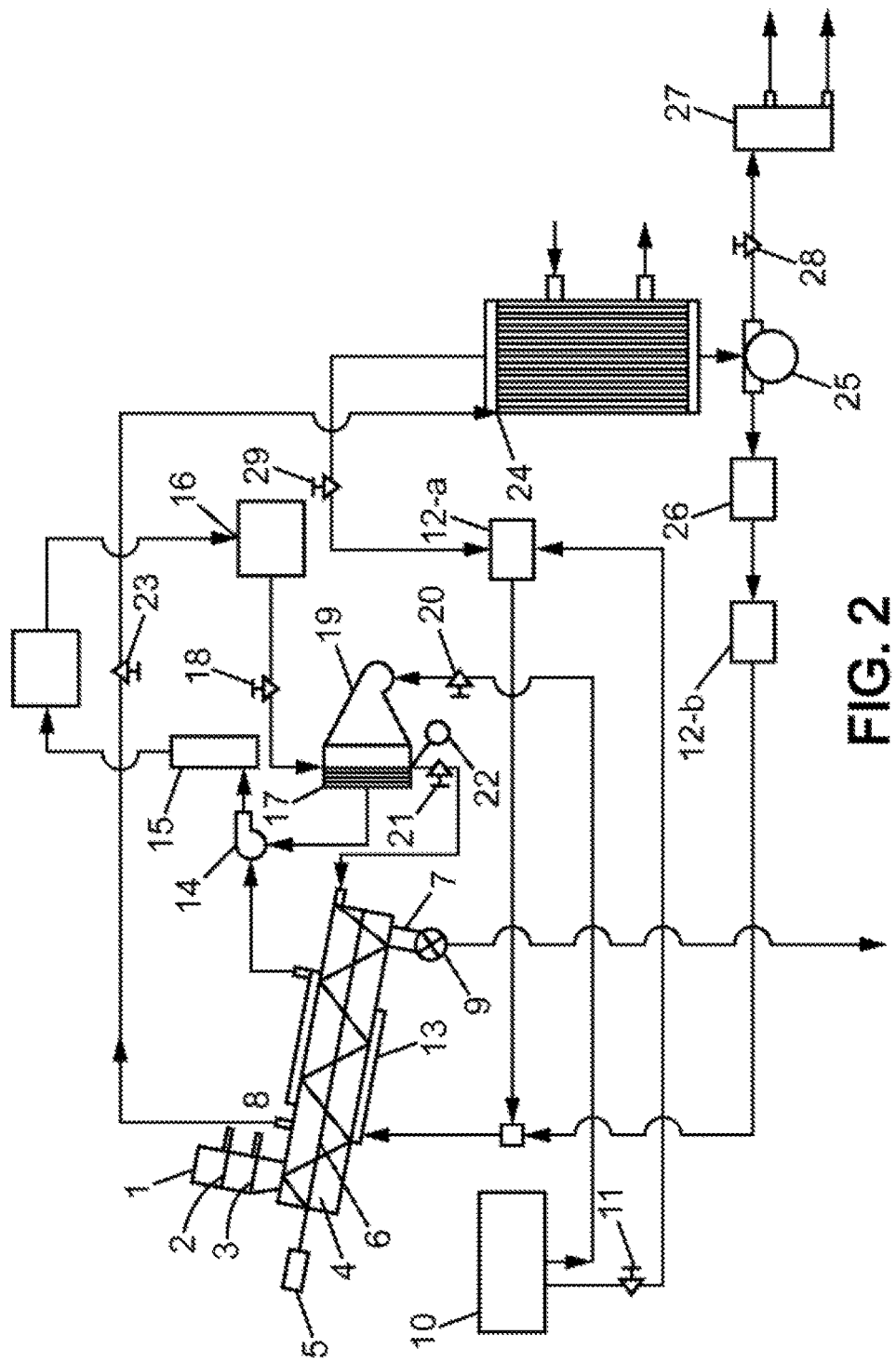

In another embodiment, represented in FIG. 2, the uncondensed vapor-gas products obtained after condensation of the vapor-gas products formed in the reactor 4 by steam thermolysis are thermally treated in the burner 12-a in order to heat the reactor 4 directly, independently of the combustion of wastewater obtained from the condensate which is also burned but by another burner 12-b, to heat the reactor 4. In this embodiment, burner 12-a is fed fuel from the tank 10 through valve 11. The tank 10 is also connected to burner 19 of the steam superheater 17.

With the method for treating carbonaceous materials by steam thermolysis which has been described above, the toxic by-products represented by wastewater resulting from condensation of steam thermolysis products from rubber waste are treated and reused in the carbon black production line. The proposed method thus makes it possible to address the pollution problem linked to the presence and concentration of wastewater in plants for treating carbonaceous materials. It can reduce or even completely eliminate the risk of clogging and fouling in the pipes and drainage of these plants. Lastly, it provides a particularly attractive alternative for the treatment of such water, as it not only eliminates the associated nuisances but also adds value to these by-products by using them as a source of heat energy for the thermolysis of carbonaceous waste.

The invention is illustrated by the following example:

Device for Implementing the Method for Treating Carbonaceous Materials by Steam Thermolysis According to Embodiments of the Invention In the following example, the unit for implementing the method according to the invention is composed of two steam-thermolysis lines, each with a minimum processing capacity of 1 t/h of shredded tires, which have some equipment in common: a common carbon black processing line and a common treatment system for gas and water emissions.

Equipment

The unit essentially comprises the following sets of equipment:

A—Equipment of the steam thermolysis line;
B—Equipment of the carbon treatment line; and
C—Equipment for treatinq atmospheric and water emissions.

A—Equipment of the Steam Thermolysis Line:

A-1. Conveyor System for Feeding Two Reactors:

The bulk density of shredded tires is characterized by its low value of 400-500 kg/m$^3$ (shred size 50 mm by 50 mm); therefore the conveyor for each reactor must deliver up to 2.5 m$^3$/h of raw materials. A hopper with a minimum capacity of 20 hours of operation can be used, which is 50 m$^3$.

A-2. Hopper Valves for Loading/Unloading the Reactor:

Reactor feeding can be controlled by double hopper valves (double dump gate, double flapgate air-lock valve) having a D-shaped cross-section which may be equal to 10" (250 mm), for example, a relaying capacity of up to 4 m$^3$/h, for example, is suitable.

The second valve is opened when a certain weight/volume level is reached in the space between the two valves. The double dump valve is controlled relative to the loading valves to ensure that material does not accumulate in the reactor. The amount of solid products formed is thus monitored (about 45% of the incoming shredded material, in one example).

In addition, the gate for loading the top of the hopper is equipped with a nitrogen injection system, to prevent air from entering the screw reactor.

A-3. Screw Conveyor for Unloading the Carbon:

Each of the production lines can be equipped with a screw conveyor which allows lowering the temperature of the carbon black as it leaves the reactor. The carbon black produced then enters the solid treatment portion that is common to the entire facility.

A-4. Screw Reactor for Steam Pyrolysis of Tires:

The thermolysis reactor comprises three stacked cylindrical screw chambers (for example diameter Ø=600 mm, wall thickness t=6 mm, chamber length L1=6 m, and total length with motors and bearings L3=9.5 m) in which thermolysis of the tires takes place. The shredded material is conveyed in the chambers by three worm screws rotating at a speed set by a rectifier (electronic) converting the power of the worm screw's electric motor.

The shredded material is fed through the inlet to the upper chamber, and heating begins. Next, the tires are guided by the worm screw (stainless steel SS 321) along the entire length of the chamber, and after that they fall into the second thermolysis chamber positioned under the first and the temperature increases, and then they pass into the third chamber where the reaction is completed (stainless steel SS 310).

The worm screws are rotated by a transmission chain of a single planetary-type gear motor, known to the skilled person, with power exceeding 5 kW and a mechanical or AC (electronic) variable speed drive/power regulator.

The worm screws are heated by heat transfer via radiation in the reactor casing (13), where the hot combustion gases (1000-1050° C.) resulting from combustion of the thermolysis gases are circulating.

In the heating area outside the screws, there is a superheater coil (17) that brings the steam to a temperature of 500-600° C. at a maximum pressure of 5 bar, using the heat of the fumes as well. This superheated steam is then injected into the screw feeding in the shredded tires.

The gaseous fractions from the tire decomposition, mixed with steam, are extracted in the middle portion of the reactor and sent to the condenser (24) for gaseous thermolysis products.

A-5. Combustion Chamber for Thermolysis Gas:

The combustion chamber can provide the energy (from burning the products obtained from thermolysis) necessary for the thermolysis reaction. The combustion chamber is equipped with a standard automatic burner that uses gas (for combustion of the thermolysis gas) and liquid fuel such as Weishaupt WM-GL 10.

A fan supplies air to the combustion reaction occurring in the burners with an estimated air consumption of 2400 kg/h per combustion chamber. The thermolysis gas that remains after condensation of the thermolysis fuel oil in the condenser is also injected into the combustion chamber.

A-6. Wastewater Treatment Device:

The wastewater produced in the condenser is directly injected into the flame of a cyclone burner by a set of spray nozzles.

The temperature and dwell time are defined to ensure complete oxidation of organic compounds and TOTAL elimination of odors. In addition, the carbon dust contained in the wastewater does not form ash inside the burner because it is oxidized. The combustion chamber is cleaned about once a year.

The addition of steam (originating from the wastewater treatment) to the combustion gases where it acts as a heating medium has certain advantages over the use of fumes as a heating medium:

1. The specific heat capacity of the vapor-gas heating medium is 20 to 25% greater than the specific heat capacity of the combustion products alone (combustion gases), which reduces the consumption of air to be added to the heating medium by 20 to 25%.

2. The addition of steam to the gases reduces not only the oxygen but also other combustion products which are harmful (carbon monoxide, nitrogen oxides, etc.) in the gases, by diluting them with steam; therefore this heating medium is more environmentally pure than products from combustion of the liquid fuel oil used to heat the screw reactor.

3. This steam-gas heating medium has a more advantageous heat transfer coefficient than that of the combustion gases alone, thereby increasing the efficiency of the heat transfer in the screw reactors and steam generator.

A-7. Steam Generator:

Steam generators are used to produce the steam required for optimization of the tire thermolysis reaction in the reactor. The steam is produced from water coming from the scrubber (15). The steam generator (16) only uses heat from the combustion gases after the thermolysis reactor (4) is heated.

A-8. Fuel Condenser:

Gaseous fractions from the thermolysis reactor (4) are condensed into fuel oil. The gaseous fractions pass through water-cooled sections of the condenser which results in condensation of the fuel oil. The condensed fuel oil flows into the lower part of the condenser where it is sent to fuel oil distillation equipment. The condensation temperature allows recovering the fuel oil as well as condensing the steam from the wastewater.

A-9. Equipment for Condensate Collection and Separation:

The thermolysis fuel oil from the condensers is collected in two static separators (25) of 10 m³ each. The dwell time is long enough for settling to occur, with separation into three phases: heavy bitumen, water, and fuel oil.

A level detector (such as Liquiphant) monitors the level of the various products and prevents fuel oil from being injected into the burner instead of wastewater. A buffer tank for wastewater before injection into the burner will be provided.

A-10. Fuel Oil Rectification:

This assembly consists of the light fraction evaporator and the light fraction condenser. It involves precise separation of the two fuel oil fractions (heavy and light) in order to control the characteristics of the heavy fraction as precisely as possible, particularly its flash point.

The fuel oil condensed in the condenser is directed towards an evaporator that utilizes an electric heater to vaporize the light fraction. The heavy fraction remains liquid and is pumped directly into storage tanks for heavy fuel oil. The light fraction in the gaseous state exits at the top and then is sent to the light fraction condenser where it is returned to the liquid state and then pumped into storage tanks for light fuel oil.

B—Equipment of the Carbon Treatment Line:

B-11. Equipment of the Carbon Treatment Line:

The solid residues from the thermolysis products are fed to the vibrating screen by a screw conveyor.

Another screw conveyor then brings the carbon black to the buffer silo for carbon black storage. After grinding, the treated materials after grinding are sent to the magnetic separation, where the process of separating the carbon and the metal cords occurs; the metal accumulates in the hopper and then is sent to a storage bin before removal.

C—Equipment for Treating Atmospheric and Water Emissions

C-12. Scrubber for Released Gases and Steam Condensation:

Standardized equipment common to the two production lines. The scrubber (15) is used to treat fumes from the combustion of thermolysis gases and fuel oil in the burner, and thus limit the emission of pollutants (primarily SOx and NOx). This provides a base wash of the combustion gases. A pH probe placed in the wash water is used to regulate the amount of NaOH injected. The gas scrubbing capacity of the scrubber is limited to 20,000 Nm³/h for a temperature of gases released into the environment of about 50° C.

The gases are then routed to an exhaust chimney at least 10 m in height. This chimney comprises a measurement platform according to standard NF-X 44052, which is positioned to provide the relevant measurement points (straightness of the flue upstream and downstream, flow conditions, etc.). A bleeder is placed on the scrubber, to lower the concentration of the water circulating in the gas wash cycle in order to maintain concentrations sufficiently low to ensure good transfer. Lining is provided for resistance to the high gas temperatures.

Product Characteristics

1. Fuel Oil from Thermolysis:

The facility as described above produces fuel oil from thermolysis in quantities of 400-450 kg fuel oil per ton of shredded tires. The thermolysis fuel oil coming from the facility has the following characteristics:

TABLE 1

Characteristics of thermolysis fuel oil

| Parameters | Unit | Values |
|---|---|---|
| DENSITY | kg/m³ | 940 to 1050 |
| VISCOSITY AT 20° C. | cSt | ≥9.5 |
| VISCOSITY AT 100° C. | cSt | ≤40 |
| Volume distilled at 250° C. | % v/v evaporated | <65 |
| Volume distilled at 350° C. | | <85 |
| Flash point | ° C. | ≥70 |
| Appearance | — | dark at 20° C. |
| Water content | % mass | <0.5 |
| Insoluble content | % mass | <0.25 |
| Sulfur content | % mass | <1 |
| Cloud point | ° C. | +2 maximum |
| Pour point | ° C. | −9 maximum |
| Carbon residue (in the 10% distillation residue) | % mass | 0.30 maximum |
| Cetane number measured | — | 40 minimum |

2. Carbon Black:

The facility produces the solid product known as carbon black in a ratio of 350 kg carbon black per ton of shredded tires. The carbon black obtained under these conditions has the following characteristics:

TABLE 2

Characteristics of carbon black

| Parameters | Units | Values |
|---|---|---|
| pH | | <7.9 |
| Specific surface area | m²/g | >60 |
| Density | kg/m³ | <375 |
| Ash | % mass | <14 |
| Humidity | % mass | <1 |
| Hydrocarbons | % mass | <1 |
| Organic matter | % mass | <5 |
| Sulfur | % mass | <1.5 |
| VOC | % mass | <2 |
| Iodine value | mg/g | <150 |
| Heavy metals | mg/kg | <1000 |
| Chromium | mg/kg | <60 |
| Mercury | mg/kg | <60 |

TABLE 2-continued

Characteristics of carbon black

| Parameters | Units | Values |
|---|---|---|
| Barium | mg/kg | <1000 |
| Selenium | mg/kg | <500 |
| Antimony | mg/kg | <60 |
| Cadmium | mg/kg | <75 |
| Arsenic | mg/kg | <2 |
| Lead | mg/kg | <90 |

Ecological Standards

Environmental emissions from the unit according to the invention comply with applicable standards per French regulations and regulations applicable to facilities classified as posing an environmental risk (Installations Classées pour la Protection de la Environnement—ICPE), particularly regional decrees governing allowable emissions.

1. Water Emissions

The only water emissions produced by the facility correspond to blowdown from the scrubber that treats the combustion gases. The maximum blowdown rate does not exceed 0.5 m$^3$/h or 12 m$^3$/day.

Reference rate
Maximum per day: 35 m$^3$/day

| Parameter | Maximum daily Concentration (mg/l) | Maximum daily flow (g/day) |
|---|---|---|
| TSS | 30 | 900 |
| Total Organic Carbon | 40 | 1200 |
| COD - gross | 125 | 3750 |
| BOD5 - gross | 40 | 1200 |
| Mercury and its compounds, expressed as mercury | 0.03 | 0.9 |
| Cadmium and its compounds, expressed as cadmium | 0.05 | 1.5 |
| Thallium and its compounds, expressed as thallium | 0.05 | 1.5 |
| Arsenic and its compounds, expressed as arsenic | 0.1 | 3 |
| Lead and its compounds, expressed as lead | 0.2 mg/l | 6 |
| Chromium and its compounds, expressed as chromium | 0.5 (of which Cr6+: 0.1) | 15 (of which Cr6+: 3) |
| Copper and its compounds, expressed as copper | 0.5 | 15 |
| Nickel and its compounds, expressed as nickel | 0.5 | 15 |
| Fluorides | 15 | 450 |
| Free CN | 0.1 | 3 |
| Total hydrocarbons | 5 | 150 |
| AOX | 5 | 150 |
| Dioxins and furans | 0.3 ng/l | 9 µg/l |

2. Atmospheric Emissions

Atmospheric emissions from the facility are composed of:

combustion gases after their treatment by the gas scrubber, air suctioned to limit dust during carbon treatment and which is treated by a bag filter then used as combustion air.

These gaseous emissions comply with the following concentration limits:

LINE NO. 1: GAS SCRUBBER a) Total dust, HCl, HF, SO$_2$, NO$_x$, NH$_3$, TOC

| | Concentration Average value | | Flow rate Average daily value g/h | |
|---|---|---|---|---|
| Parameters | daily mg/Nm$^3$ | over 1/2 hr mg/Nm$^3$ | 2 lines in operation | 1 line in operation |
| Total dust | 10 | 20 | 150 | 80 |
| Hydrogen chloride (HCl) | 10 | 20 | 150 | 80 |
| Hydrogen fluoride (HF) | 1 | 2 | 15 | 8 |
| Sulfur dioxide (SO$_2$) | 50 | 200 | 750 | 375 |
| Nitrogen oxides (NO$_x$) | 200 | 400 | 3000 | 1600 |
| Carbon monoxide (CO) | 50 | 100 | 750 | 400 |
| Organic substances in gaseous or vaporous state, expressed as total organic carbon (TOC) | 10 | 20 | 150 | 80 | b) Metals

| Parameters (in all physical forms) | Concentration (mg/m$^3$) | Flow rate Average daily value g/h | |
|---|---|---|---|
| | | 2 lines in operation | 1 line in operation |
| Cadmium and its compounds, expressed as cadmium (Cd) + Thallium and its compounds, expressed as thallium (Tl) | 0.05 | 0.75 | 0.4 |
| Mercury and its compounds, expressed as mercury (Hg) | 0.05 | 0.75 | 0.4 |
| All other metals and their compounds (Sb + As + Pb + Cr + Co + Cu + Mn + Ni + V) | 0.5 | 7.5 | 4 | c) Dioxins and furans

| Parameters | Concentration | Flow rate Average daily value | |
|---|---|---|---|
| | | 2 lines in operation | 1 line in operation |
| Dioxins and furans | 0.1 ng/m$^3$ | 1.5 µg/h | 0.8 µg/h |

The results of the measurements made to verify compliance with emission limits are under standard conditions for temperature and pressure, meaning 273 K, at a pressure of 101.3 kPa and with an oxygen content of 11% in dry gas.

The invention has been described and illustrated in the present detailed description and in the appended figures. The invention is not limited to the embodiments presented. Other variations and embodiments can be derived and implemented by the skilled person upon reading the present description and the appended figures.

In the claims, the word "comprise" does not exclude other elements or other steps. The indefinite article "a" does not exclude the plural. The various characteristics described and/or claimed may advantageously be combined. Their presence in the description or in different dependent claims

The invention claimed is:

1. A method for treating carbonaceous materials by steam thermolysis, comprising:
   shredding carbonaceous waste materials,
   introducing the shredded carbonaceous waste materials into a steam thermolysis reactor heated by combustion gases, including gases laden with steam being introduced into the steam thermolysis reactor, so as to heat said shredded carbonaceous waste materials to a temperature between 200 and 700° C. during a steam thermolysis reaction to form vapor-gas products,
   cooling the combustion gases to a temperature between 200 and 450° C. and discharging said gases,
   discharging from the reactor the vapor-gas products formed in the reactor by steam thermolysis, followed by condensation of said vapor-gas products to provide a condensate,
   separating the condensate obtained by said condensation into water containing residual hydrocarbons and into oil;
   wherein, the water separated from the condensate is directed injected into a burner by spray nozzles and combusted in the burner, wherein the water is treated at a temperature and dwell time sufficient to provide complete oxidation of organic compounds and elimination of odors, and wherein the water combusted in the burner generates steam as a source of heat energy for the steam thermolysis reactor, and wherein the source of heat energy further comprises (i) said combustion gases coming from combustion of a fuel, (ii) combustion of uncondensed gases obtained after condensation of said vapor-gas products formed in the steam thermolysis reactor or a combination thereof.

2. The method according to claim 1, wherein the uncondensed gases obtained after condensation of the vapor-gas products formed in the steam thermolysis reactor by steam thermolysis are heat-treated in order to heat the steam thermolysis reactor independently of combusting water coming from separating the condensate.

3. The method according to claim 1, wherein said shredded carbonaceous waste materials are brought to a temperature between 400 and 600° C. inside the reactor.

4. The method according to claim 1, wherein the oil from the condensate is evaporated in a first fraction with a boiling point less than or equal to 200° C, called the light fraction, and a second fraction with a boiling point greater than 200° C., called the heavy fraction.

5. The method according to claim 4, wherein the boiling point of the light fraction is between 60° C. and 200° C., and the boiling point of the heavy fraction is between 201° C. and 600° C.

6. The method according to claim 1, wherein a portion of the discharged combustion gases are condensed in water which is used to generate the steam used to heat the shredded carbonaceous waste materials inside the reactor.

* * * * *